3,412,038
DETERMINATION OF CARBON DISULFIDE
Charles A. Plantz, Pittsburgh, Pa., assignor to Mine Safety Appliances Company, Pittsburgh, Pa., a corporation of Pennsylvania
No Drawing. Filed Mar. 31, 1966, Ser. No. 538,979
12 Claims. (Cl. 252—408)

ABSTRACT OF THE DISCLOSURE

A colorimetric indicator responsive to carbon disulfide is formed of an inert granular solid such as silica gel carrying a reagent containing a cupric salt, piperazine or an organosubstituted piperazine, and if desired, a copper complexing agent and humectant. A bed of the colorimetric indicator together with a bed of desiccant is contained in an openable transparent tube and atmosphere to be tested is passed sequentially through the desiccant and indicator beds; the length of indicator bed over which a color change occurs is dependent on the concentration of carbon disulfide.

---

This invention relates to the colorimetric detection and quantitative determination of carbon disulfide vapors in other gases.

In a popular and simple gas analysis method, a sample of gas is drawn through an elongate bed of colorimetric indicator disposed in a transparent tube and the presence of a gas to which the indicator is responsive causes a color change of the indicator. When tested under standard conditions, the length of bed over which a color change occurs is dependent on the concentration of the gas to be measured, thus providing for quantitative measurement of the gas being determined. The tube is sealed at both ends for storage and when a determination is to be made the sealed ends are opened as the gas to be tested is passed through the tube. This method of analysis is commonly known as the "length-of-stain" method.

Heretofore the length-of-stain method has not been used for determinging carbon disulfide as no suitable indicator material was available. A suitable indicator must provide a distinct color change on reaction with the gas to be determined, must give a sharp division line between changed and unchanged indicator and for most purposes, must be sufficiently sensitive to detect the gas being analyzed at or below the allowable limit, 20 p.p.m. by volume in the case of carbon disulfide vapors.

It is therefore an object of this invention to provide a colorimetric indicator responsive to carbon disulfide vapor suitable for use in the length-of-stain analysis. Another object is to provide a simple and direct method for determining carbon disulfide vapors in other gases, particularly in air. Another object is to provide an apparatus for the determination of carbon disulfide.

This invention is predicated on my discovery that a granular solid that carries a cupric salt and a piperazine compound changes color from pale blue to brown when contacted with air or other gas containing carbon disulfide vapors. When air or other gas containing carbon disulfide is passed through a body of indicator disposed in a tube of glass or other transparent material not affected by the indicator, the presence of carbon disulfide causes development of the brown color along the length of the body of reagent in the direction in which the air is passed, thus affording an indication of the presence of carbon disulfide. Preferably, the indicator also contains a copper complexing agent, as such indicators exhibit a somewhat sharper color division line than those not containing a complexing agent.

The carrier, preferably a granular absorbent, does not enter into the color producing reaction but serves merely as a chemically inert physical carrier for the reagent. Among the various carriers available, for example, alumina and clay coated glass beads, silica gel is preferred. Consequently the invention will be described by way of illustration with particular reference thereto.

Any water soluble cupric salt may be used, such as, for example, cupric acetate, cupric chloride, cupric sulfate and cupric nitrate, or a cupric salt soluble in aqueous complexing agents when complexing agents are used, such as, for example, $CUCO_3 \cdot Cu(OH)_2$.

Suitable piperazine compounds include piperazine, piperazine hexahydrate, and any organosubstituted piperazine that has at least one secondary nitrogen, such as, for example, lower alkyl substituted piperazine such as 2-methylpiperazine, 2,5-dimethylpiperazine and 2,6-dimethylpiperazine.

Any of the well-known copper complexing agents may be used, such as EDTA, the disodium salt of ethylene diamine tetracetic acid, and $\alpha$-amino acids with at least one hydrogen on the $\alpha$-amino nitrogen, such as, for example, glycine, D,L-alanine, serine and L-proline.

In accordance with this invention, the silica gel, or other absorbent, is impregnated with the cupric salt, the piperazine compound and, if desired, a copper complexing agent and humectant.

As exemplifying this embodiment of the invention, 100 g. of silica gel are impregnated with an aqueous solution containing from 0.008 to 0.8 g., preferably .015 g,. of cupric salt, from 1 to 40 g., preferably 9 g., of piperazine compounds, from 0 to 0.25 g., preferably 0.15 g., of copper complexing agent, and from about 0 to 20 g., preferably .95 g., of triethanolamine humectant, and the mixture is dried until the mixture appears dry and free-flowing, suitably by vacuum drying at 90° C. for about two hours, or until a constant weight is reached.

The response of indicators of this invention to carbon disulfide varies somewhat the changes in humidity or moisture content of the gas sample being tested. It is desirable, therefore, to use a gas sample having substantially the same humidity as that used in the calibration. This is most conveniently accomplished by passing the gas sample through a desiccant prior to contacting it with the indicator. Preferred detector tubes therefore contain, in addition to the bed of indicator, a bed of desiccant disposed between the indicator bed and the inlet end of the tube. Any desiccant inert to carbon disulfide may be used, and calcium chloride or silica gel are preferred. When a silica gel desiccant is used, it is preferred to age the tube at 65° C. for three days to equilibrate, as some piperazine transfers from the indicator bed to the desiccant bed.

As indicating the sensitivity of the indicator, it is possible using detector tubes as described above containing copper acetate piperazine hexahydrate and glycine to detect quantitatively 5 p.p.m. by volume of $CS_2$ in air using a 300 ml. min. sample for 45 seconds with a tube of 3.0 mm. I.D. having an indicator bed 50 mm. long.

The response of the indicator is relatively insensitive to temperature; however at cold temperature below about 50° F. the length of coloration is slightly longer for a given concentration of carbon disulfide and is of a lighter color which subsequently darkens when the tube is warmed to room temperature. It is preferred that the tube be warmed with the hand when the sample being analyzed is below about 50° F.

The indicator response is quite specific to $CS_2$ and is not affected by the presence of interferents frequently present with $CS_2$, such as $SO_2$, $H_2S$ or $CO_2$.

The silica gel should be neither too fine nor too coarse, so that the tube will contain an adequately packed body of the reagent without creating too great resistance to flow. I have found that silica gel passing 35 and retained in 60 mesh gives satisfactory results.

According to the provisions of the patent statutes, I have explained the principle and mode of practice of my invention and have described what I now consider to represent its best embodiment. However, I desire to have it understood that, within the scope of the appended claims, the invention may be practiced otherwise than as specifically described.

I claim:
1. A colorimetric indicator responsive to carbon disulfide consisting of an inert granular solid carrying a reagent consisting essentially of a water soluble cupric salt and an amine from the group consisting of piperazine and lower alkyl substituted piperazine having at least one secondary nitrogen.
2. A colorimetric indicator according to claim 1 in which the reagent contains a copper complexing agent.
3. A colorimetric indicator according to claim 1 in which the carrier is silica gel.
4. A colorimetric indicator according to claim 1 in which the reagent contains a copper complexing agent selected from the group consisting of EDTA and an $\alpha$-amino acid having at least one hydrogen on the $\alpha$-amino nitrogen.
5. An indicator according to claim 3 that contains from about 1 to 40 grams of amine and 0.008 to 0.80 grams of cupric salt for each 100 grams of carrier and from 0 to 0.25 gram of a copper complexing agent selected from the group consisting of EDTA and an $\alpha$-amino acid having at least one hydrogen on the $\alpha$-amino nitrogen.
6. A colorimetric indicator according to claim 5 that contains triethanolamine.
7. A colorimetric indicator according to claim 5 in which the copper salt is cupric acetate and the amine is piperazine hexahydrate.
8. A colorimetric indicator according to claim 7 in which the complexing agent is glycine.
9. Means for determining carbon disulfide in a gas comprising the combination of a sealed transparent tube, and disposed therein a body of silica gel carrying a reagent consisting essentially of a water soluble copper salt and an amine selected from the group consisting of piperazine and lower alkyl substituted piperazines having at least one secondary nitrogen, said body upon passage through the tube, after breaking the seal, of gas carrying carbon disulfide being changed in color.
10. Means according to claim 9 in which a bed desiccant inert to carbon disulfide is disposed within the tube between said body and one end of the tube.
11. Means according to claim 10 in which said desiccant is selected from the group consisting of silica gel and calcium chloride.
12. Means according to claim 10 in which said reagent contains a copper complexing agent selected from the group consisting of EDTA and an $\alpha$-amino acid having at least one hydrogen on the $\alpha$-amino nitrogen.

References Cited
UNITED STATES PATENTS 2,689,831  9/1954  Gehauf et al. _____ 252—408

MAYER WEINBLATT, *Primary Examiner.*